US 6,329,893 B1

(12) United States Patent
Furukawa et al.

(10) Patent No.: US 6,329,893 B1
(45) Date of Patent: Dec. 11, 2001

(54) BUCKLE WITH NON-CONTACT BUCKLE SWITCH

(75) Inventors: Koichi Furukawa; Yutaka Yamaguchi, both of Tokyo (JP)

(73) Assignee: Takata Corporation, Tokyo (JP)

(*) Notice: Subject to any disclaimer, the term of this patent is extended or adjusted under 35 U.S.C. 154(b) by 0 days.

(21) Appl. No.: 09/769,730

(22) Filed: Jan. 26, 2001

(30) Foreign Application Priority Data

Feb. 2, 2000 (JP) .................................................. 12-024854

(51) Int. Cl.[7] ...................................................... H01H 9/00
(52) U.S. Cl. ........................ 335/205; 335/207; 340/457.1
(58) Field of Search .................................. 335/205–207; 73/865.9; 340/457.1, 551, 552; 242/107; 180/268

(56) References Cited

U.S. PATENT DOCUMENTS

| 5,742,986 | * | 4/1998 | Corrion et al. | ................. | 24/633 |
| 5,752,299 | * | 5/1998 | Vivacqua et al. | ................. | 24/633 |
| 5,898,366 | * | 4/1999 | Brown et al. | ................. | 340/457.1 |
| 5,944,135 | * | 8/1999 | Blackburn et al. | ................. | 180/268 |

* cited by examiner

Primary Examiner—Lincoln Donovan
Assistant Examiner—Tuyen Nguyen
(74) Attorney, Agent, or Firm—Kanesaka & Takeuchi

(57) ABSTRACT

A buckle is provided with a non-contact buckle switch to find an engagement condition with a tongue. When a lock member of the buckle is disposed in a locking position, a magnetic field produced by a magnet and applied to an IC Hall element differs from a case where the lock member is disposed in a non-locking position. The difference of the magnetic field is caused by the magnetic lock member moved close to the magnet and the IC Hall element, whereby an electrical current outputted by the electromotive force of the IC Hall element is changed. Thus, it is possible to determine that the lock pin is set in the locking position. The buckle switch is improved in durability and can operate more reliably.

7 Claims, 8 Drawing Sheets

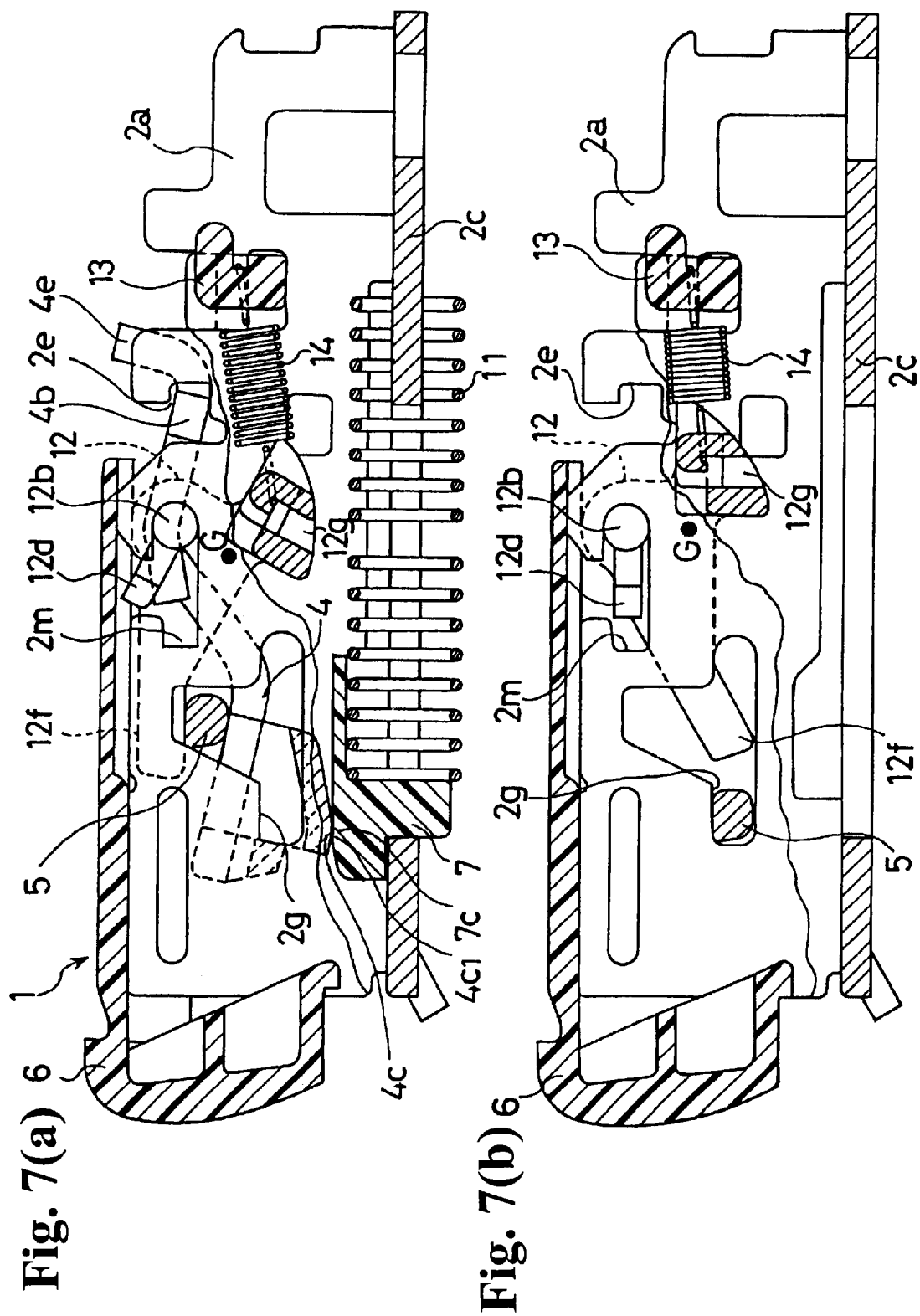

BUCKLE WITH NON-CONTACT BUCKLE SWITCH

BACKGROUND OF THE INVENTION AND RELATED ART STATEMENT

The present invention relates to buckles to be used in safety belt devices, such as seat belt devices, mounted on seats of automobiles and other transportation vehicles. In particular, the present invention relates to a buckle provided with a buckle switch to be switched by a latching operation of a tongue and the buckle.

Presently, seat belt devices are mounted on seats of automobiles and other transportation vehicles for protecting passengers in a case of emergency, such as collision. The seat belt device of this type is generally provided with a buckle for easily fasten and unfasten a belt. The buckle includes a latch member for latching a tongue, which is resiliently urged in the latching direction toward the tongue, and a lock member for maintaining the latch member and the tongue in a latched state.

The buckle is provided with a buckle switch for determining a latched state. The buckle switch displays the latched state of the tongue and buckle, and in accordance with the latched state of the tongue and buckle, operates and controls other components of the seat belt device, such as a retractor, and automotive devices relating to the operation of the seat belt device.

A buckle switch is known, which generally uses a contact-type switch, such as a board-type switch or a microswitch. In the contact-type switch, switching is repeatedly performed at a contact part of the buckle switch by latching and unlatching the tongue and buckle. Therefore, there is a risk of a poor connection due to wear of the contact part or the like, and the durability is not always on a high level.

A buckle switch using a non-contact type switch is proposed in Japanese Unexamined Patent Publication (KOKAI) No. 10-155521. In the non-contact type buckle switch disclosed in this publication, light emitted to a latch member for latching a tongue by a field supply source of a light-reflection device is applied to a reflecting surface of the latch member, and the light reflected by the reflecting surface is detected by a field-effect unit of the light-reflection device, thereby determining a latched state and an unlatched state of the tongue and buckle.

By using the non-contact type buckle switch, the risk of a poor connection due to wear of the contact part is avoided because the switch does not include contact parts, thereby improving durability.

However, in the non-contact type buckle switch using a light reflection device, a risk of difficulty in reliable operation is anticipated because the light-reflection device is likely to become dull to reflected light due to fixture errors of the latch member and the light-reflection device, foreign materials, such as liquid like water and juice, dust, and rust formed by liquid. The contact-type switch is also likely to be affected by the foreign materials, such as liquid like water and juice, dust, and the rust formed by liquid.

Accordingly, an object of the present invention is to provide a buckle provided with a buckle switch which is improved in durability and can more reliably operate.

SUMMARY OF THE INVENTION

According to the first aspect of the present invention, a buckle comprises a base including two side walls; an ejector provided on the base to slidably move in a longitudinal direction between a non-operational position which is a position of the ejector when the buckle does not latch a tongue and an operational position which is a position of the ejector when the buckle latches the tongue, the ejector moving to the operational position when the tongue is inserted, and moving to the non-operational position and removing the tongue from the buckle when the buckle unlatches the tongue; a latch member supported by the two side walls to pivot between a non-operational position which is a position of the latch member when the buckle does not latch the tongue and an operational position which is a position of the latch member when the buckle latches the tongue, the latch member being urged toward the operational position, and pivoted to the operational position when the tongue is inserted into a predetermined position, thereby latching the tongue; an operational member for releasing the latched tongue and latch member; a lock member provided on the two side walls to move between a non-operational position which is a position of the lock member when the latch member does not latch the tongue and an operational position which is a position of the lock member when the latch member latches the tongue, the lock member being set in the operational position when the latch member latches the tongue and holding the latch member in the operational position of the latch member, and being moved to the non-operational position by the operational member when the latch member unlatches the tongue.

The buckle further includes a non-contact type buckle switch to be switched by the movement of one of the ejector, the latch member, and the lock member which are movable components of the buckle. The buckle switch includes a magnet and a Hall element for generating an electromotive force by a magnetic field of the magnet. The movable components of the buckle are made of magnetic materials. The magnetic field of the magnet applied to the Hall element varies when one of the movable components of the buckle moves between an operational position and a non-operational position of one of the movable components of the buckle, and the buckle switch is switched by the variation in the magnetic field.

According to the second aspect of the present invention, the magnet and the Hall element may be positioned opposite to each other in a direction perpendicular to a direction in which one of the movable components of the buckle moves toward the operational position thereof. Thus, the magnetic field of the magnet applied to the Hall element when the one of the movable components of the buckle is set in the operational position thereof differs from the magnetic field of the magnet applied to the Hall element when the one of the movable components of the buckle is set in the non-operational position thereof.

According to the third aspect of the present invention, either one of the movable components of the buckle may be positioned between the magnet and the Hall element or the Hall element may be positioned between the one of the movable components of the buckle and the magnet.

According to the fourth aspect of the present invention, the magnet and the Hall element may be positioned side by side in the same direction as that where the one of the movable components of the buckle moves toward the operational position thereof, so that the magnetic field of the magnet applied to the Hall element when the one of the movable components of the buckle is set in the operational position thereof differs from the magnetic field of the magnet applied to the Hall element when the one of the movable components of the buckle is set in the non-operational position thereof.

In the buckle thus formed, according to the present invention, a switching operation is performed in a non-contact manner by using a Hall effect by the magnet and the Hall element, whereby poor connection in contact parts due to wear or the like can be avoided, and the durability can be significantly improved as compared with a contact-type switch, such as a board-type switch or a microswitch.

The buckle switch is not likely to be affected by fixture errors, foreign materials, such as liquid like water and juice, dust, and rust formed by liquid, compared with the buckle switch disclosed in the above prior publication, which uses a light-reflection device, whereby a more reliable operation is possible.

In particular, a magnetic field of the magnet applied to the Hall element is directly changed by the movable component of the buckle, and the movable component of the buckle can be free from mechanical contact directly or indirectly with the magnet and the Hall element. Thus, the durability of the buckle switch is further improved, the operation of the buckle switch is made more certain, and the buckle switch is made more reliable.

BRIEF DESCRIPTION OF THE DRAWINGS

FIGS. 7(a) and 7(b) show operations of avoiding a release by inertia in a latching operation or in a latched state, wherein FIG. 7(a) is a sectional view of an unlatched state with the tongue and FIG. 7(b) is a sectional view of a latched state with the tongue;

DETAILED DESCRIPTION OF PREFERRED EMBODIMENTS

Embodiments according to the present invention will be described below with reference to the drawings.

Figure 1:
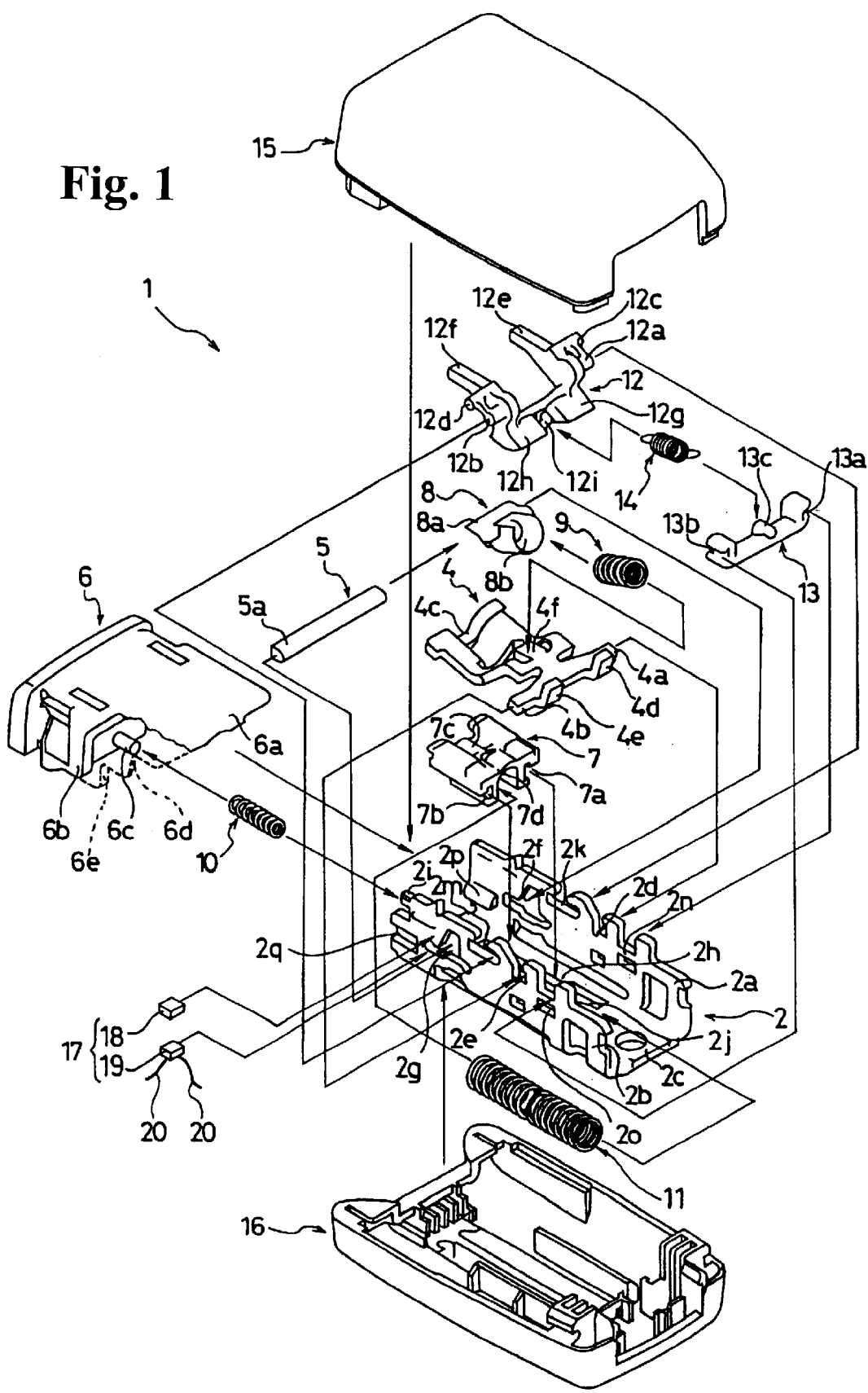
FIG. 1 is an exploded perspective view of a buckle according to an embodiment of the present invention.
Figure 2:
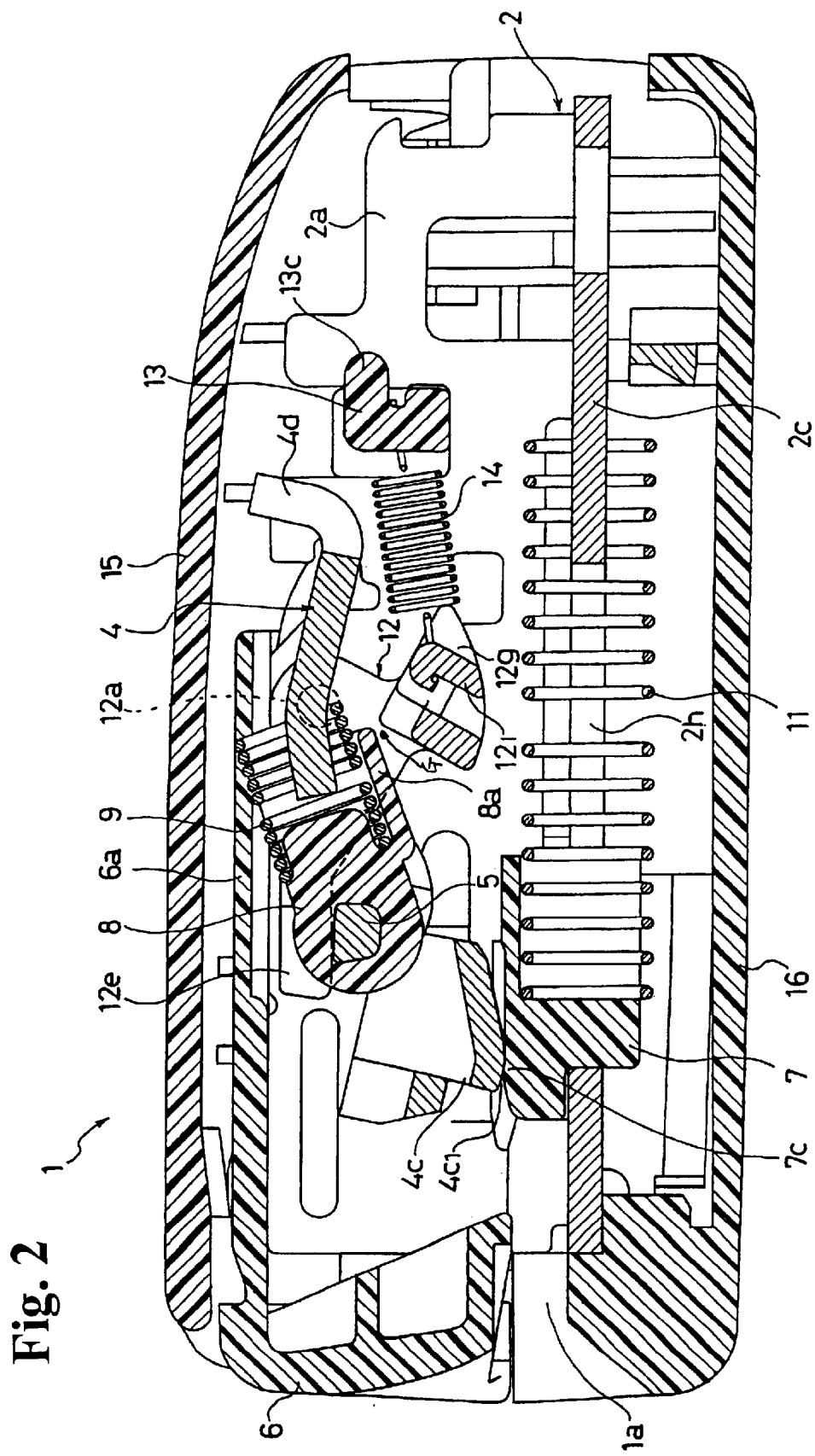
FIG. 2 is a sectional view showing an unlatched state of a tongue with the buckle according to the embodiment.
Figure 3:
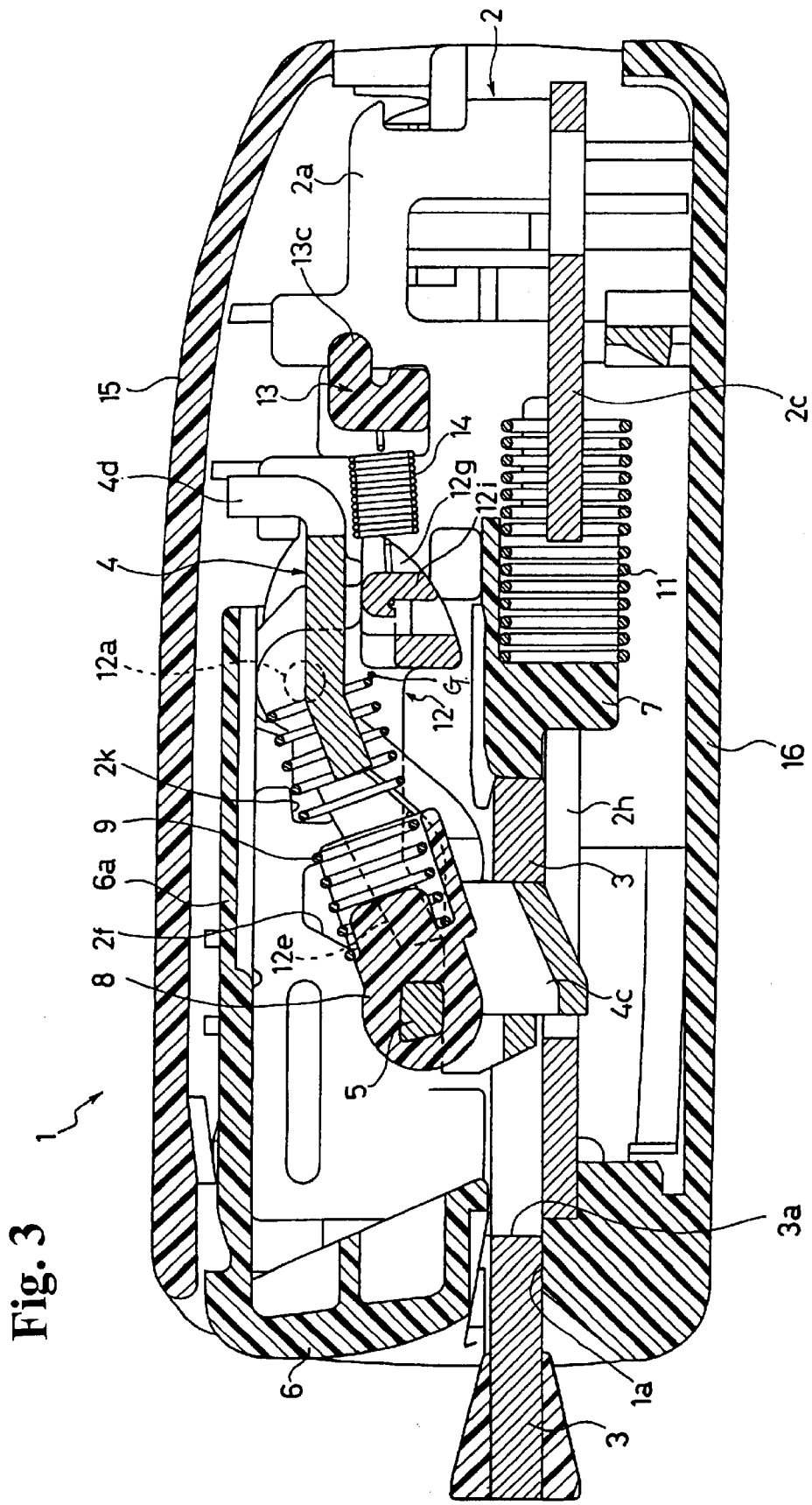
FIG. 3 is a sectional view showing a latched state of the tongue with the buckle according to the embodiment.
Figure 4:
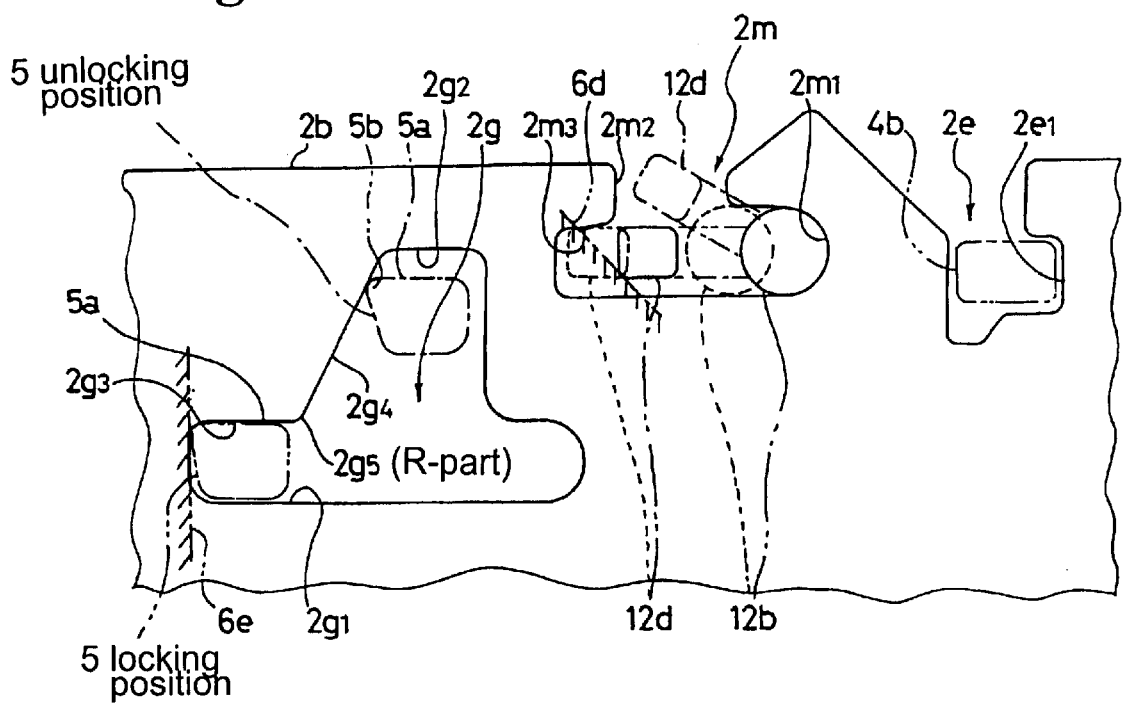
FIG. 4 is an explanatory side view of a guide hole, a supporting groove, and a guide groove formed in a side wall of a base, according to the embodiment.

FIG. 1 is an exploded perspective view of a buckle according to an embodiment of the present invention. FIG. 2 is a sectional view showing an unlatched state of a tongue with the buckle according to the embodiment. FIG. 3 is a sectional view showing a latched state of the tongue with the buckle according to the embodiment. FIG. 4 is an explanatory view showing a guide hole, a supporting groove, and a guide groove formed in a side wall of a base according to the embodiment. The terms "right" and "left" used in the following description represent the right and the left, respectively, in each drawing.

In FIGS. 1 to 4, a buckle 1 includes a base 2 formed in a U-shape having side walls 2a and 2b and a bottom 2c; a latch member 4 pivotally supported by the side walls 2a and 2b of the base 2 and capable of being latched to a tongue 3; a lock pin 5 movably mounted on the side walls 2a and 2b of the base 2, for preventing the latch member 4 from moving in the unlatching direction when the latch member 4 latches the tongue 3; an operational button 6 mounted on the side walls 2a and 2b of the base 2 to move in the longitudinal direction of the base 2; an ejector 7 mounted on the bottom 2c of the base 2 to slide in the longitudinal direction of the base 2 and capable of urging the tongue in a direction of unlatching the tongue from the buckle 1; a slider 8 having a lock pin supporting part 8a for supporting the lock pin 5; a slider spring 9 provided between the slider 8 and the latch member 4 in a compressed state, thereby constantly urging the slider 8 so that the lock pin 5 is pressed toward the latch member 4; a button spring 10 for constantly urging the operational button 6; an ejector spring 11 for constantly urging the ejector 7; an inertia lever member 12 pivotally supported by the side walls 2a and 2b of the base 2 to be movable in the longitudinal direction of the base 2 for preventing the lock pin 5 from being moved by inertia, when the latch member 4 latches the tongue 3, to a position at which the latched state is released; a spring holder 13 supported by and fixed to the side walls 2a and 2b of the base 2; a lever spring 14 provided between the inertia lever member 12 and the spring holder 13 in an extended state; an upper cover 15 and a lower cover 16 mating with each other and covering the base 2 with the components; and a buckle switch 17 mounted on the side wall 2b of the base 2.

The side walls 2a and 2b of the base 2 are respectively provided with supporting grooves 2d and 2e for rotatably supporting rotational shafts 4a and 4b of the latch member 4; inverted T-shaped guide holes 2f and 2g for supporting and guiding the lock pin 5 at ends 5a and 5b thereof; guide rails 2h mating with guide grooves 7a and 7b of the ejector 7 so that the ejector 7 is slidably guided in the longitudinal direction (one of the guide rails 2h provided symmetrical with respect to a longitudinal axis is not shown); guide grooves 2k and 2m for supporting rotational shafts 12a and 12b of the inertia lever member 12 so that the inertia lever member 12 pivots and moves in the longitudinal direction, and receives pressure-receiving parts 12c and 12d for restoring the inertia lever member 12 from an operating position to a non-operating position by being pressed by the operational button 6; mounting parts 2n and 2o to which the spring holder 13 is mounted to detachably mate therewith; and guide parts 2p and 2q for guiding the tongue 3 when inserted. The base 2 also includes a spring supporting part 2i provided on the side wall 2b for supporting the button spring 10 at one end thereof, and a spring supporting part 2j for supporting the ejector spring 11 at one end thereof.

The supporting groove 2e, the inverted T-shaped guide hole 2g, and the guide groove 2m are formed in the side wall 2b in such shapes as shown in FIG. 4. That is, the supporting groove 2e includes a shaft-supporting part 2e1 for rotatably supporting the rotational shafts 4a and 4b of the latch member 4. The inverted T-shaped guide hole 2g includes a longitudinal-hole part 2g1 longitudinally extending and a vertical-hole part 2g2 vertically extending from an intermediate part of the longitudinal-hole part 2g1. An upper part at the left end of the longitudinal-hole part 2g1 forms a lock-pin restraining part 2g3 for restricting an upward movement of the lock pin 5 by downwardly pressing the lock pin 5 when the lock pin 5 is positioned in a locking position (a part shown by a two-dot-chain line in FIG. 4, which corresponds to an operating position of a lock pin according to the present invention), as described below.

The left end of the vertical-hole part 2g2 serves as a guide part 2g4 for guiding the lock pin 5 when the lock pin 5 moves from an unlocking position (a part shown by a one-dot-chain line in FIG. 4, which corresponds to a non-operating position of the lock pin according to the present invention) to the locking position, or in the inverse direction, as described below. The guide part 2g4 is formed on an inclined face extending to be tilted to the right from the longitudinal-hole part 2g1. The lock-pin restraining part 2g3 is connected to the guide part 2g4 via an arc-shaped R-part 2g5. As described below, the radius of the R-part 2g5 is preferably as smaller as possible.

The guide groove 2m includes a rotational shaft supporting part 2m1 for supporting the inertia lever member 12 at the rotational shafts 12a and 12b, an opening 2m2 through which the pressure-receiving part 12d can pass, as shown by a one-dot-chain line in FIG. 4, when the inertia lever member 12 pivots between the non-operating position and the operating position, and a pivoting-restricting part 2m3 for restricting the pivoting motion of the inertia lever member 12 toward the non-operating position by the pressure-receiving part 12d coming into contact therewith, as shown by two-dot-chain lines in FIG. 4, when the inertia lever member 12 is moved by inertia.

Although not shown in FIG. 4, the supporting groove 2d, the guide hole 2f, and the guide groove 2k provided in the side wall 2a are formed in the same shapes as the supporting groove 2e, the guide hole 2g, and the guide groove 2m. A longitudinal-hole part 2f1, a vertical-hole part 2f2, a lock-pin restraining part 2f3, a guide part 2f4, and an R-part 2f5 are described in the following description, though the reference numerals are not described in the drawings.

The latch member 4 includes a joggle part 4c for latching the tongue 3, unlatching-force receiving parts 4d and 4e at which the latch member 4 is pressed in the unlatching direction by the operational button 6 coming into contact with the unlatching-force receiving parts 4d and 4e at an end of the operational button 6 opposite to an operational end thereof, and a spring supporting part 4f for supporting the slider spring 9 at one end thereof. The latch member 3 moves between an unlatching position in which the latch member 4 does not latch the tongue 3 (corresponding to the non-operating position of the latch member according to the present invention) and a latching position in which the latch member 4 latches the tongue 3 (corresponding to the operating position of the latch member according to the present invention). The latch member 4 can pivot about the rotational shafts 4a and 4b between the unlatching position and the latching position.

The lock pin 5 is made of a magnetic material. The lock pin 5 is kept in contact with an upper face of the latch member 4 at a lower end of the lock pin 5. The lock pin 5 moves to the locking position, in which the latch member 4 is locked in the latched state when the latch member 4 latches the tongue 3, by being positioned by a resilient force of the slider spring 9 at the side of the longitudinal-hole parts 2f1 and 2g1 of the inverted T-shaped guide holes 2f and 2g, respectively, and to the unlocking position to the right from the locking position, in which the latch member 4 unlatches the tongue 3, by being positioned by an unlatching force of the operational button 6 at the side of the vertical-hole parts 2f2 and 2g2 of the inverted T-shaped guide holes 2f and 2g, respectively. The lock pin 5 has a substantially rectangular cross-section or a substantially inverted trapezoidal cross-section, in which the lower side is shorter than the upper side. The lock pin 5 moves so as to keep contacting with the guide parts 2f4 and 2g4 and the R-parts 2f5 and 2g5 of the guide holes 2f and 2g, respectively, at a corner part 5a of the lock pin 5, and to keep contacting with the restraining parts 2f3 and 2g3 at an upper face 5b of the lock pin 5. The corner part 5a includes the R-part.

When the lock pin 5 is disposed in the guide holes 2f and 2g of the side walls 2a and 2b, respectively, the ends of the lock pin 5 pass through the guide holes 2f and 2g, and protrude to the outside from the side walls 2a and 2b by predetermined amounts, respectively. In this case, a protruding end 5a of the lock pin 5 protruding to the outside from the side wall 2b further protrudes from a magnet 18 and an IC Hall element 19 included in the buckle switch 17. The operational button 6 can be brought into contact with the protruding end 5a at a lock pin actuating part 6e of the operational button 6 which is described below.

The operational button 6 includes a planar part 6a extending in the longitudinal and widthwise directions, side walls 6b formed by bending the planar part 6a at side edges thereof (the other one of the two side walls 6b provided at the other side edges is not shown in the drawing, but hereinafter, reference numeral 6b conveniently represents the two side walls), and a spring supporting part 6c disposed to be offset toward one side edge from a longitudinally intermediate part of the operational button 6, for supporting the button spring 10 at the other end thereof.

AS shown in FIGS. 2 and 3, a cross-section of the operational button 6 including the planar part 6a and the side walls 6b is substantially U-shaped extending to the right of the rotational shafts 12a and 12b of the inertia lever member 12. The side walls 6b of the operational button 6 are provided with inertia lever actuating parts respectively including inclined surfaces for pressing the pressure-receiving parts 12c and 12d of the inertia lever member 12, thereby pivoting the inertia lever member 12 from the operating position to the non-operating position (in FIG. 1, an inertia lever actuating part 6d mounted on the side wall 6b is shown by a dotted line, and in FIG. 4, the inertia lever actuating part 6d is schematically shown). Although not shown in FIGS. 1 to 3, the side walls 6b of the operational button 6 are provided with lock pin actuating parts respectively including perpendicular surfaces for pressing the lock pin 5 at the ends thereof, thereby moving the lock pin 5 from the locking position to the unlocking position (in FIG. 1, the lock pin actuating part 6e mounted on the side wall 6b is shown by a dotted line, and in FIG. 4, the lock pin actuating part 6e is schematically shown).

In this embodiment, when the operational button 6 moves to the right to release a latched state of the tongue 3 and the buckle 1, the inertia lever actuating parts 6d come into contact with the pressure-receiving parts 12c and 12d of the inertia lever member 12 and upwardly press the inertia lever member 12 at the pressure-receiving parts 12c and 12d toward the non-operating position of the inertia lever member 12. Then, the lock pin actuating parts 6e come into contact with the ends of the lock pin 5 and move the lock pin 5 toward the unlocking position of the lock pin 5.

The ejector 7 can move between a non-operating position shown in FIG. 2 at which the buckle 1 does not latch the tongue 3, and an operating position shown in FIG. 3 at which the buckle 1 latches the tongue 3. The ejector 7 provided at a longitudinally intermediate part includes a projection 7c to come substantially into a point contact with the joggle part 4c of the latch member 4 at the bottom of the joggle part 4c, and a spring supporting part 7d for supporting the ejector spring 11 at the other end thereof. The slider 8 includes a spring supporting part 8b for supporting the slider spring 9 at the other end thereof.

The inertia lever member 12 forms a shock-proof system for preventing the lock pin 5 and the operational button 6 from being moved by inertia to the unlatching position of the operational button 6 when the buckle 1 latches the tongue 3. The inertia lever member 12 includes levers 12e and 12f, mass bodies 12g and 12h where the centers of gravity are disposed in a line in a direction substantially perpendicular to the levers 12e and 12f, and a spring supporting part 12i for supporting the lever spring 14 at one end thereof. In this case, masses of the mass bodies 12g and 12h are set so that the moment of the inertia acting on the centers of gravity of the mass bodies 12g and 12h about the rotational shafts 12a and 12b is greater than the moment about the rotational shafts 12a and 12b of a force by which the inertia lever member 12 is upwardly pressed at the pressure-receiving parts 12c and 12d thereof by the inertia lever actuating part 6d of the operational button 6 when it moves in the unlatching direction.

The spring holder 13 includes a spring supporting part 13c for supporting the lever spring 14 at the other end thereof.

The buckle switch 17 is a non-contact type switch provided with at least the magnet 18 and the IC Hall element 19, as shown in FIG. 1, the non-contact type switch using a Hall effect. As shown by enlarged views shown in FIGS. 5(a) and 5(b), the magnet 18 is positioned directly above the lock-pin restraining part 2g3 of the guide hole 2g formed in the side wall 2b and is fixed to the side wall 2b. The IC Hall element 19 is positioned directly under the lock-pin restraining part 2g3 of the guide hole 2g and is fixed to the side wall 2b. That is, the magnet 18 and the IC Hall element 19 are disposed to oppose to each other in a direction perpendicular to the direction in which the lock pin 5, as a moving member of the buckle according to the present invention, moves into the locking position of the lock pin 5.

Therefore, the lock pin 5 is positioned between the magnet 18 and the IC Hall element 19 when the lock pin 5 is disposed in the locking position, and is positioned completely separated from the magnet 18 and the IC Hall 19 when the lock pin 5 is disposed in the unlocking position.

The magnet 18 produces a magnetic field directed to the IC Hall element 19. When the IC Hall element 19 is applied with the magnetic field perpendicular to a constant electrical current applied to the IC Hall element 19, the IC Hall element 19 generates electromotive forces perpendicular to the directions of the electrical current and the magnetic field, respectively, and the IC Hall element 19 outputs electrical currents generated by the electromotive forces. The locking position of the lock pin 5 is determined by variations in the electrical currents outputted by the IC Hall element 19.

Figure 6:
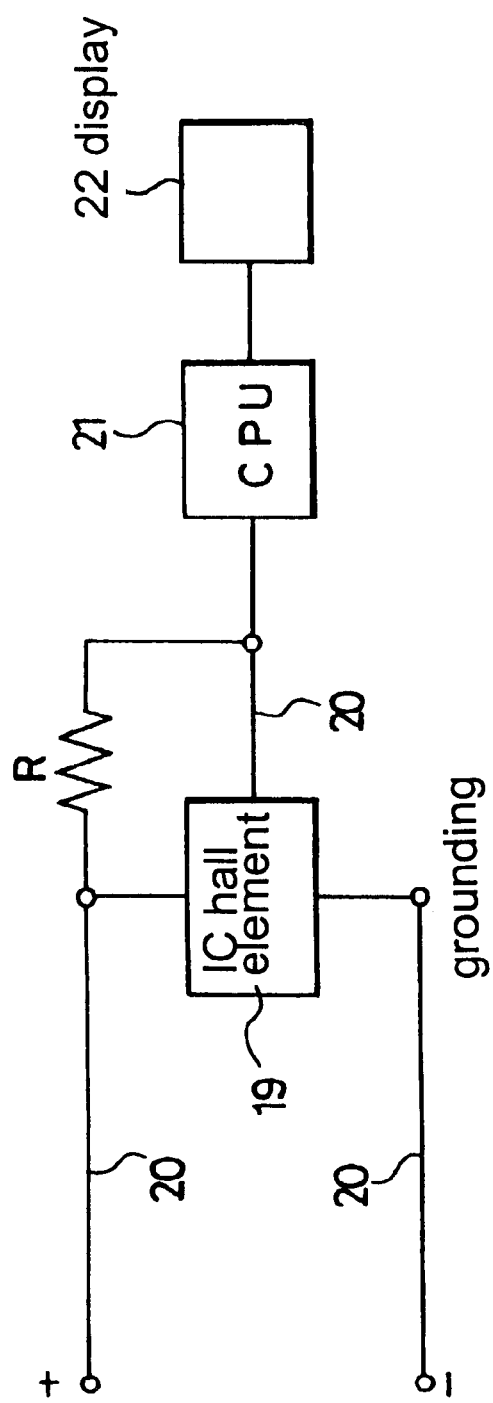
FIG. 6 is a block diagram of a circuit for determining variation in the amount of electrical current outputted by an IC Hall element of the buckle switch.

FIG. 6 is a block diagram of a circuit for determining the variation in electrical current outputted by the IC Hall element 19.

In FIG. 6, the IC Hall element 19 is electrically connected to a central processing unit (hereinafter referred to as a CPU) 21 via a conductive wire 20. The CPU 21 determines whether or not the lock pin 5 is set in the locking position by determining the variation in the electrical current supplied from the IC Hall element 19. When the CPU 21 determines that the lock pin 5 is set in the locking position, the CPU 21 drives a display 22, such as a display lamp, to perform display operation.

Figure 5A:
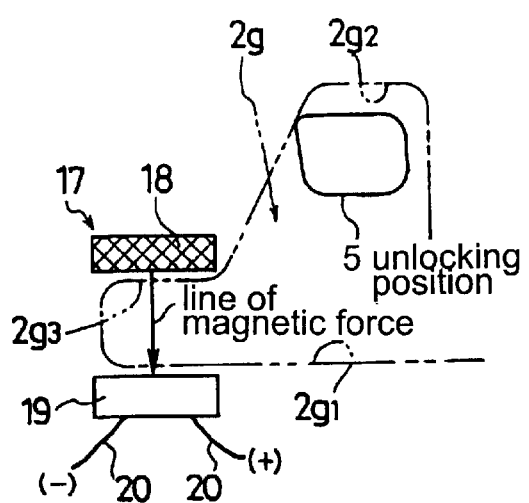
FIG. 5(a) is an explanatory side view showing a lock pin disposed in an unlocking position.

In the buckle switch 17 thus formed, as shown in FIG. 5(a), when the lock pin 5 is disposed in the unlocking position and is not disposed between the magnet 18 and the IC Hall element 19, the magnet 18 and the IC Hall element 19 oppose directly to each other. The IC Hall element 19 is applied with the magnetic field in the direction of an arrow from the magnet 18, whereby the IC Hall element 19 generates an electromotive force in accordance with a direction of the magnetic field of a magnetic material, and an electrical current generated by the electromotive force is supplied to the CPU 21 through the conductive wire 20.

Figure 5B:
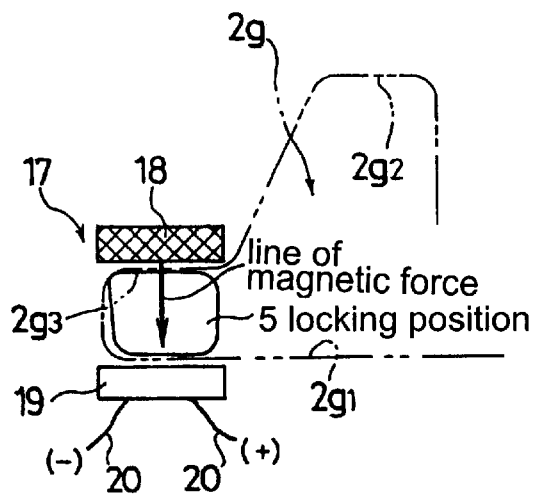
FIG. 5(b) is an explanatory side view of the lock pin disposed in a locking position, used in the buckle shown in FIG. 1.

In FIG. 5(b), when the lock pin 5 is positioned in the locking position between the magnet 18 and the IC Hall element 19, the magnet 18 and the IC Hall element 19 do not oppose directly to each other. Therefore, the magnetic field in the direction of an arrow is interrupted by the lock pin 5, whereby the magnetic field of the magnet 18 applied to the IC Hall element 19 differs from that in a state in which the lock pin 5 is positioned in the unlocking position. Therefore, the electromotive force generated by the IC Hall element 19 when the lock pin 5 is positioned in the locking position differs from that in the case in which the lock pin 5 is positioned in the unlocking position, and the electrical current differing according to the difference in the electromotive force is supplied to the CPU 21 through the conductive wire 20.

The CPU 21 determines the difference in the electrical current outputted from the IC Hall element 19 between the time before the lock pin 5 is positioned in the locking position and the time after the lock pin 5 is positioned in the locking position, whereby the CPU 21 determines whether or not the lock pin 5 is set in the locking position. Then, the CPU 21 actuates the display 22, when the CPU 21 determines that the lock pin 5 is set in the locking position, to perform a display such that the buckle 1 has firmly latched the tongue 3. The CPU 21 does not drive the display 22 when the CPU 21 determines that the lock pin 5 is not set in the locking position. In this case, the display 22 does not display the indication of latching between the tongue 3 and the buckle 1.

A known buckle pretensioner (not shown) is connected to the base 2 of the buckle 1. The buckle pretensioner operates in an emergency, such as a collision of the vehicle, and quickly retracts the base 2 toward right, thereby quickly holding the passenger by a seat belt.

A latching operation between the buckle 1 and the tongue 3, and an operation of the buckle switch 17, according to the present embodiment, are described below.

FIGS. 7(a) and 7(b) show the latching operation between the buckle and the tongue according to the embodiment and an operation of preventing a release due to inertia in the latched state. FIG. 7(a) shows a non-latched state in which the tongue is not latched, and FIG. 7(b) shows a latched state in which the tongue is latched by the buckle. In order to conveniently describe the operations, FIGS. 7(a) and 7(b) show sectional views in an irregular way, and components which are not directly related to the description are omitted.

In the non-latched state of the buckle 1 in which the buckle 1 does not latch the tongue 3, the ejector 7 is set in the left most position by a resilient force of the ejector spring 11, as shown in FIGS. 2 and 7(a). In the left most position of the ejector 7, the ejector 7 upwardly presses the latch member 4 at the joggle part 4c of the latch member 4, and the latch member 4 is placed on the projection 7c of the upper face of the ejector 7 substantially in a point contact at a bottom 4c1 of the joggle part 4c of the latch member 4. In this state, the latch member 4 is located away from an insertion path of the tongue 3, and is positioned in the non-latched position with the tongue 3.

In this case, the lock pin 5 is upwardly pressed by the latch member 4 while being in contact with the upper face of the latch member 4, so as to be set in the unlocking position disposed in the vertical hole parts 2f2 and 2g2 of the inverted T-shaped guide holes 2f and 2g, respectively. In the non-latched state of the buckle 1, the levers 12e and 12f of the inertia lever member 12 are placed on the lock pin 5, whereby the levers 12e and 12f of the inertia lever member 12 are set in the non-operating position by the lock pin 5 upwardly pressed to the unlocking position. The non-operating position is shown by a dotted line in FIG. 7(a). The rotational shafts 12a and 12b of the inertia lever member 12 are brought into contact with the rotational shaft supporting part 2m1 by being pulled by a resilient force of the lever spring 14.

When the lock pin 5 is disposed in the unlocking position, the magnet 18 and the IC Hall element 19 of the buckle switch 17 oppose directly to each other, as shown in FIG. 5(a). Therefore, the CPU 21 does not drive the display 22, and the display 22 does not perform a display operation.

In the non-latched state of the buckle 1 shown in FIGS. 2 and 5(a), when the tongue 3 is inserted through a tongue-insertion opening 1a disposed at the left of the buckle 1, the tongue 3 comes into contact with the ejector 7 at the right end of the tongue 3 and the left end of the ejector 7, whereby the ejector 7 is pressed toward the right. The ejector 7 moves toward the right while compressing the ejector spring 11 in accordance with the insertion of the tongue, whereby the joggle part 4c of the latch member 4 placed on the ejector 7 at the projection 7c thereof is removed or separated from the ejector 7. Since the lock pin 5 is downwardly pressed by a resilient force of the slider spring 9 applied via the slider 8 and the lock pin 5 urges the latch member 4 at the joggle part 4c, the latch member 4 pivots on the rotational shafts 4a and 4b in the counterclockwise direction in the drawing. In this movement, the joggle part 4c of the latch member 4 enters the path of the tongue 3 and mates with an anchoring hole 3a of the tongue 3, and the latch member 4 is set in the latched position. When the inserting force of the tongue 3 is released, the ejector 7 presses the tongue 3 at the right end thereof by the resilient force of the ejector spring 11, the tongue 3 is latched by the buckle 1 by engaging the joggle part 4c at the right end of the anchoring hole 3a of the tongue 3, and the tongue 3 and the buckle 1 are set in the latched state, as shown in FIGS. 3 and 7(b).

In this case, by the resilient force of the slider spring 9, the lock pin 5 is transferred downwardly in the vertical-hole part 2g2 while being guided by the guide part 2g4, and comes into the longitudinal-hole part 2g1 and is transferred to the left, whereby the lock ping 5 is set in the locking position. The lock pin 5 disposed in the locking position is restrained by the lock-pin restraining part 2g3, whereby the upward movement of the lock pin 5 is restricted. Since the lock pin 5 thus holds the latch member 4 in the latching position, the latch between the tongue 3 and the buckle 1 can be firmly maintained without removing the latch member 4 from the anchoring hole 3a of the tongue 3.

In the latched state of the tongue 3 and the buckle 1, since the spring supporting part 12i of the inertia lever member 12 is pulled by a resilient force of the lever spring 14, the inertia lever member 12 pivots counterclockwise on the rotational shafts 12a and 12b supported by the rotational shaft supporting part 2m1. Therefore, as shown in FIG. 7(b), the ends of the levers 12a and 12b are disposed in a path of the lock pin 5 to the unlocking position, the pressure-receiving parts 12c and 12d are disposed so as to pass through an opening 2k2 and the opening 2m2, respectively, and the inertia lever member is disposed in the operational position. When the inertia lever member 12 is disposed in the operational position, the lock ping 5 is prevented from being moved to the unlocking position by contacting the levers 12e and 12f.

When the lock pin 5 is disposed in the locking position, the lock pin 5 is disposed between the magnet 18 and the IC Hall element 19 of the buckle switch 17, as shown in FIG. 5(b). Therefore, the magnetic field of the magnet 18 applied to the IC Hall element 19 differs from that when the lock pin 5 is disposed in the unlocking position, whereby the amount of electrical current outputted by the IC Hall element 19 varies, that is, the buckle switch 17 is switched. The CPU 21 detects the variation in the current amount, thereby driving the display 22 to perform a display operation. Since the lock pin 5 is automatically positioned between the magnet 18 and the IC Hall element 19 when the lock pin 5 is disposed in the locking position, the non-contact type buckle switch 17 including the magnet 18 and the IC Hall element 19 stably and reliably operates and determines the latched state of the buckle 1.

Thus, the buckle 1 reliably latches the tongue 3, the tongue 3 is reliably prevented from being released from the buckle 1, and the display 22 shows that the tongue 3 has been firmly latched by the buckle 1.

When pressing the operational button 6 to the right so as to release the latched state of the tongue 3 and the buckle 1, the inertia lever actuating part 6d upwardly presses the inertia lever member 12 at the pressure-receiving parts 12c and 12d, whereby the inertia lever member 12 pivots clockwise on the rotational shafts 12a and 12b, so that the pressure-receiving parts 12c and 12d pass through the openings 2k2 and 2m2, respectively, and the ends of the levers 12e and 12f move upwardly from a longitudinal movement path of the lock pin 5.

In this state, when the operational button 6 is moved further to the right, the lock pin actuating part 6e drives the lock pin 5 to the right. When the lock pin 5 moves to a position in which the lock pin 5 can move into the vertical-hole part 2g2, the latch member 4 can pivot clockwise on the rotational shafts 4a and 4b because the lock pin 5 can not be restrained by the restraining part 2g3. In this case, the lock pin 5 is positioned directly under the levers 12e and 12f. The lock pin 5 can not be restrained by the restraining part 2g3, and the ejector 7 is urged by the resilient force of the ejector spring 11 in the latch releasing direction, whereby the ejector 7 raises the latch member 4, the latch member 4 pivots clockwise on the rotational shafts 4a and 4b, and the joggle part 4c is released from the anchoring hole 3a of the tongue 3 and pushes the tongue 3 out to the left. The lock pin 5 is pressed upwardly by the latch member 4 which pivots clockwise, thereby coming into the vertical-hole parts 2f and 2g. Since the lock pin 5 upwardly presses the levers 12e and 12f, the inertia lever member 12 pivots clockwise on the rotational shafts 12a and 12b.

The bottom 4c1 of the joggle part 4c of the latch member 4 is placed on the projection 7c of the ejector 7. Lastly, the ejector 7 is positioned in the left most position, the latch member 4 is disposed in the unlatching position, the lock pin 5 is disposed in the unlocking position, and the inertia lever member 12 is disposed in the non-operational position, whereby the buckle 1 comes to the unlatched state in which the tongue is unlatched, as shown in FIGS. 2 and 7(a).

Since the lock pin 5 moves to the unlocking position, the magnet 18 and the IC Hall element 19 of the buckle switch 17 again directly opposes to each other, whereby the magnetic field of the magnet 18 changes into the initial state thereof. The CPU 21 detects the change of the magnetic field, thereby stopping the operation of the display 22, whereby the display 22 does not perform display.

The CPU 21, which controls the display 22 by determining the variation of the magnetic field of the buckle switch 17, may also control other units of the seat belt device, such as a retractor, and automotive devices relating to the operation of the seat belt device, when determining the variation in the directions of the magnetic field.

Since a non-contact type buckle switch is used as the buckle switch 17 according to the embodiment, the risk of poor connection due to wear or the like can be avoided, and the durability is significantly improved as compared with a contact-type switch, such as a board-type switch or a microswitch.

Since the non-contact type buckle switch 17 uses a Hall effect by using the magnet 18 and the IC Hall element 19, the buckle switch 17 is not likely to be affected by fixture errors, foreign materials, such as liquid like water and juice, dust, and rust formed by liquid, as compared with the buckle switch disclosed in the above conventional art, which uses a light emitting device and a light receiving device, whereby a more reliable operation is possible.

In particular, the lock pin 5 does not mechanically contact directly or indirectly the magnet 18 and the IC Hall element 19. Thus, the durability of the buckle switch 17 is further improved, the operation of the buckle switch 17 is made more certain, and the buckle switch 17 is made further reliable.

The structure of the buckle switch 17 can be made simple because a mechanical contact is avoided, as described above, thereby reducing the cost of the buckle switch 17.

Figure 8A:
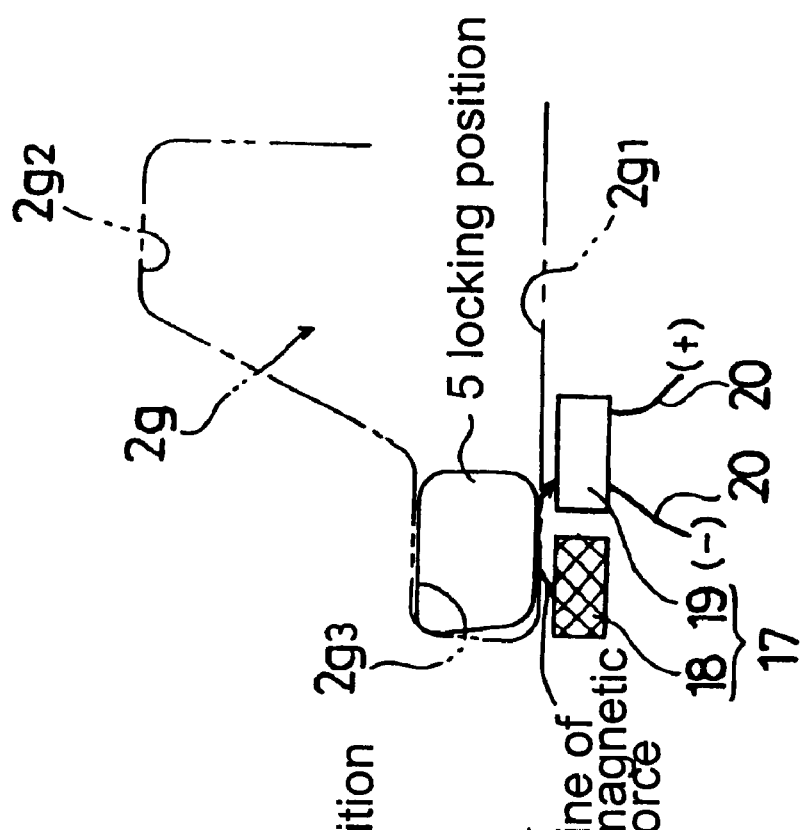
FIG. 8(a) is a schematic view of a lock pin disposed in an unlocking position in another embodiment.
Figure 8B:
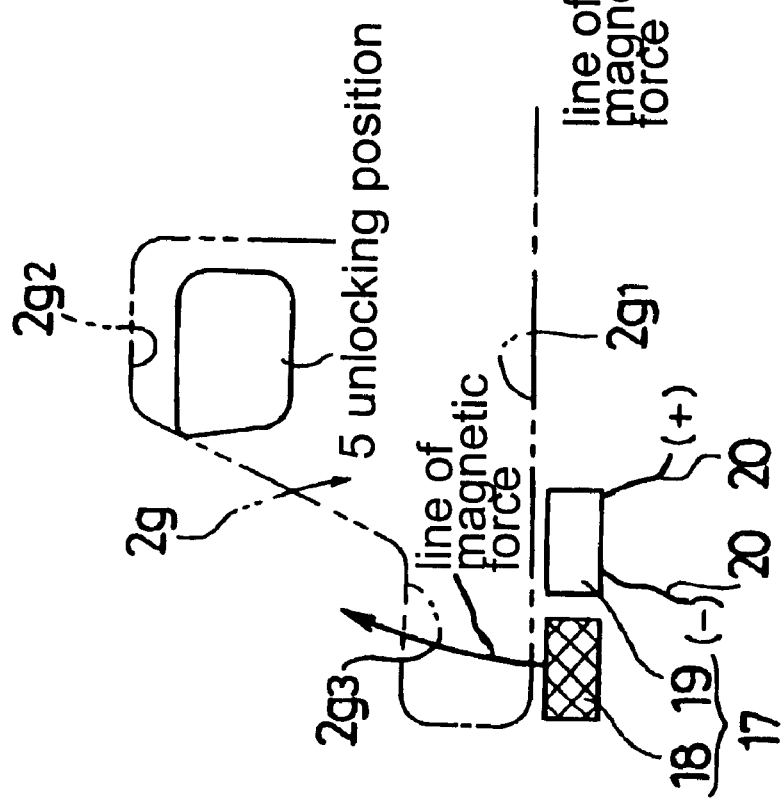
FIG. 8(b) is a schematic view of the lock pin disposed in a locking position.

FIGS. 8(a) and 8(b) partly show another embodiment of the present invention. FIG. 8(a) is a schematic view of a lock pin in an unlocking position. FIG. 8(b) is a schematic view of the lock pin in a locking position.

According to the above embodiment, the magnet 18 and the IC Hall element 19 are disposed to vertically oppose to each other with the lock pin restraining part 2g3 of the guide hole 2g therebetween. However, a magnet 18 and an IC Hall element 19 are disposed side by side along a portion of a longitudinal-hole part 2g1 of a guide hole 2g, opposite to a lock pin restraining part 2g3 of the longitudinal-hole part 2g1 of the guide hole 2g, according to the present embodiment, as shown in FIGS. 8(a) and 8(b). The magnet 18 and the IC Hall element 19 are disposed side by side in the same direction as a moving direction of a lock pin 5 moving toward the locking position. Other configuration of a buckle 1 according to the present embodiment is the same as that described in the above embodiment.

A buckle switch 17 according to the embodiment operates as described below.

When the lock pin 5 is positioned in the unlocking position, as shown in FIG. 8(a), the direction of a magnetic field produced by the magnet 18 is shown by an arrow, and the magnetic field is not significantly applied to the IC Hall element 19. Therefore, the amount of electrical current outputted by the IC Hall element 19 is small. When the lock pin 5 is positioned in the locking position, as shown in FIG. 8(b), the magnetic field of the magnet 18 applied to the IC Hall element 19 is changed by the lock pin 5, so that the direction of the magnetic field of the magnet 18 is changed as shown by the arrow in FIG. 8(b), and the magnetic field is applied to the IC Hall 19 more than that in a case in which the lock pin 5 is disposed in the unlocking position. Therefore, the amount of the electrical current outputted by the IC Hall element 19 is greater than that in the case where the lock pin 5 is disposed in the unlocking position. A CPU 21 detects the variation in the electrical current and determines that the lock pin 5 is set in the locking position, thereby operating a display 22. Other operations of the buckle 1 and the advantages thereof according to the present embodiment are the same as those which are described in the above embodiment.

Figure 9A:
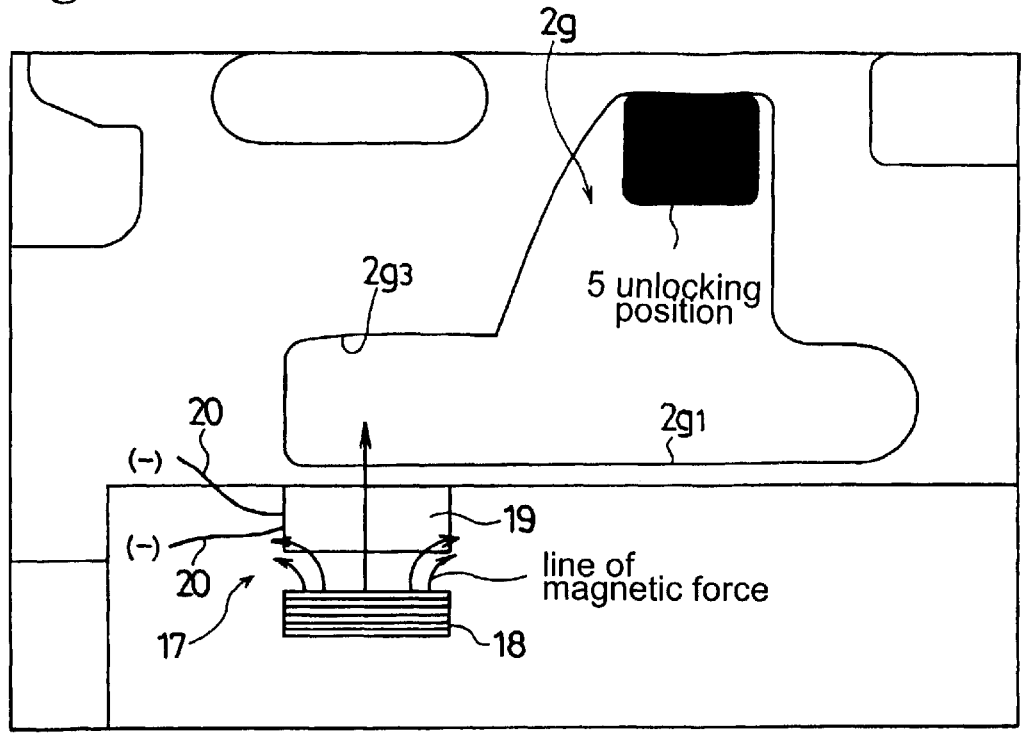
FIG. 9(a) is a schematic view of a lock pin disposed in an unlocking position in a further embodiment.
Figure 9B:
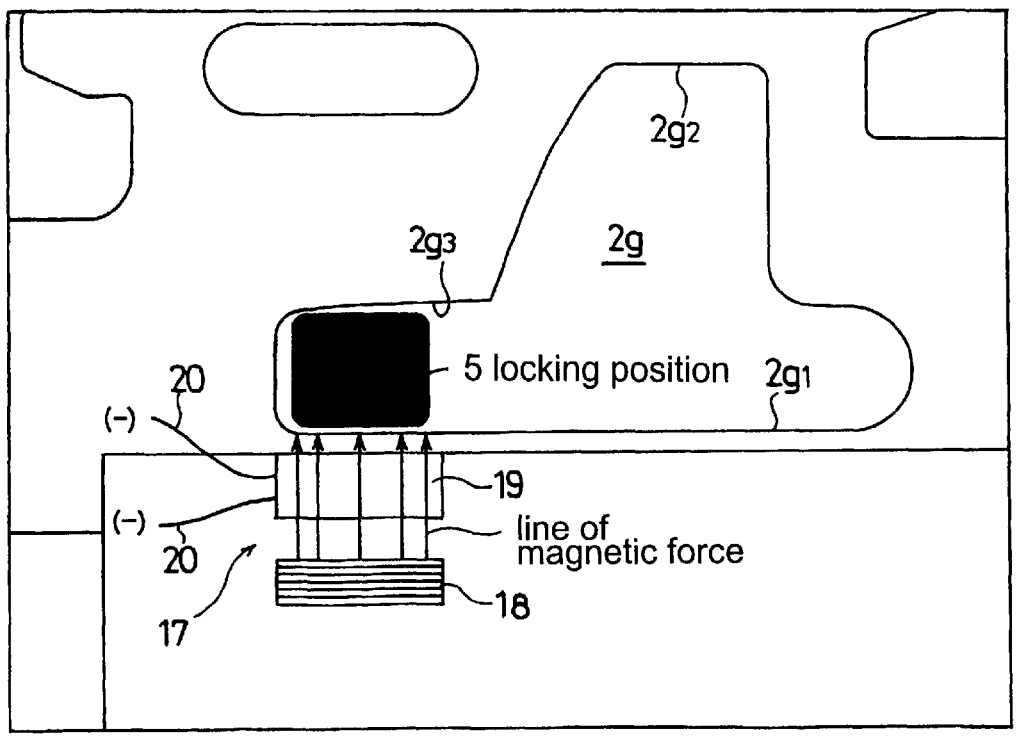
FIG. 9(b) is a schematic view of the lock pin disposed in a locking position.

FIGS. 9(a) and 9(b) partly show a further embodiment according to the present invention. FIG. 9(a) is a schematic view of a lock pin in an unlocking position. FIG. 9(b) is a schematic view of the lock pin in a locking position.

According to the embodiment shown in FIGS. 5(a) and 5(b), the magnet 18 and the IC Hall element 19 are disposed to vertically oppose to each other with the lock pin restraining part 2g3 of the guide hole 2g therebetween. In a buckle 1 according to the present embodiment, an IC Hall element 19 is disposed directly under a lock pin restraining part 2g3 of a guide hole 2g, and a magnet 18 is disposed directly under the IC Hall element 19, as shown in FIGS. 9(a) and 9(b). Therefore, when a lock pin 5 is disposed in the locking position, the lock pin 5, the IC Hall element 19, and the magnet 18 are downwardly disposed in this order in a vertical direction perpendicular to the direction where the lock pin 5 moves toward the locking position. Other configuration of the buckle 1 according to the present embodiment is the same as that described in the above embodiment.

The buckle switch 17 according to the present embodiment operates as described below.

When the lock pin 5 is disposed in the unlocking position shown in FIG. 9(a), some of lines of magnetic force are bent, as shown by arrows, whereby the density of magnetic fluxes applied to the IC Hall element 19 is low. Therefore, the amount of the electrical current outputted by the IC Hall element 19 is small. When the lock pin 5 is disposed in the locking position shown in FIG. 9(b), the magnetic field of the magnet 18 applied to the IC Hall element 19 is changed by the magnetic lock pin 5. That is, the lines of magnetic force of the magnet 18 are made straight by the affect of the magnetic lock pin 5, whereby the density of the magnetic fluxes applied to the IC Hall element 19 become high as compared with the case in which the lock pin 5 is disposed in the unlocking position. Therefore, the amount of electrical current outputted by the IC Hall element 19 is increased as compared with the case in which the lock pin 5 is disposed in the unlocking position. A CPU 21 detects the variation in the electrical current and determines that the lock pin 5 is set in the locking position, thereby actuating a display 22. Other operations of a buckle 1 and the advantages thereof according to the present embodiment are the same as those described in the above embodiments.

According to the above embodiments, the latched state of the tongue 3 and the buckle 1 is determined by detecting the lock pin 5, which is a movable component of the buckle, disposed in the locking position, whereby the buckle switch 17 is switched. However, the present invention is not limited to those embodiments. The latched state of the tongue 3 and the buckle 1 may be determined by detecting one of movable components, where a non-latching position and a latching position are set, disposed in the latching position, among the components of the buckle 1, such as the latch member 4 and the ejector 7, to switch the buckle switch 17. In this case, the magnet 18 and the IC Hall element 19 may be conveniently mounted in accordance with, for example, the latching position of one of the components where the one of the components in the latching position thereof can be reliably detected.

The magnet 18 and the IC Hall element 19 according to the above embodiments may be disposed in the positions opposite to each other. In FIG. 8, the magnet 18 and the IC Hall element 19 may be disposed directly above the lock pin restraining part 2g3 of the guide hole 2g.

As described above, in the buckle according to the present invention, the switch performs switching operation in a non-contact manner by using a Hall effect by the magnet and the Hall element, whereby poor connection in the contact parts due to wear or the like can be avoided, and the durability can be significantly improved as compared with a contact type switch, such as a board-type switch or a microswitch.

The buckle switch is not likely to be affected by fixture errors, foreign materials, such as liquid like water and juice, dust, and rust formed by liquid, as compared with the buckle switch disclosed in the prior art publication, which uses a light-reflection device, whereby a more reliable operation is possible.

In particular, a magnetic field of the magnet applied to the Hall element is directly changed by a movable component of the buckle, the movable component of the buckle can be free from mechanical contact directly or indirectly with the magnet and the Hall element, whereby the durability of the buckle switch is further improved, the operation of the buckle switch is made more certain, and the buckle switch is made more reliable. The structure of the buckle switch can be made simple because a mechanical contact is avoided, as described above, thereby reducing the cost of the buckle switch.

While the invention has been explained with reference to the specific embodiments of the invention, the explanation is illustrative and the invention is limited only by the appended claims.

What is claimed is:

1. A buckle comprising:

a base including two side walls;

an ejector provided on the base to slide in a longitudinal direction between a non-operational position where the ejector is located when the buckle does not latch a tongue and an operational position where the ejector is located when the buckle latches the tongue, said ejector moving to the operational position when the tongue is inserted and moving to the non-operational position and releasing the tongue from the buckle when the buckle unlatches the tongue;

a latch member supported by the two side walls to pivot between a non-operational position where the latch member is located when the buckle does not latch the tongue and an operational position where the latch member is located when the buckle latches the tongue, said latch member being urged toward the operational position, and pivoting to the operational position when the tongue is inserted into a predetermined position to thereby latch the tongue;

an operational member disposed on the base for releasing the latched tongue and latch member;

a lock member provided on the two side walls to be movable between a non-operational position where the lock member is located when the latch member does not latch the tongue and an operational position where the lock member is located when the latch member latches the tongue, said lock member being set in the operational position when the latch member latches the tongue and holding the latch member in the operational position, and being moved to the non-operational position by the operational member when the latch member unlatches the tongue; and a non-contact buckle switch situated near and actuated by a movable component selected from a group consisting of the ejector, the latch member and the lock member, said buckle switch including a magnet and a Hall element for generating an electromotive force by a magnetic field of the magnet, wherein said movable component is made of a magnetic material so that the magnetic field of the magnet applied to the Hall element varies when the movable component moves between the operational position and the non-operational position of the movable component, the buckle switch being switched by variation of the magnetic field.

2. A buckle according to claim 1, wherein the magnet and the Hall element are positioned to oppose to each other in a direction perpendicular to a direction where the movable component moves toward the operational position thereof so that the magnetic field of the magnet applied to the Hall element when the movable component is set in the operational position differs from the magnetic field of the magnet applied to the Hall element when the movable component is set in the non-operational position.

3. A buckle according to claim 2, wherein when the movable component is located in the operational position, the movable component is positioned between the magnet and the Hall element or the Hall element is positioned between the movable component and the magnet.

4. A buckle according to claim 3, wherein said magnet and the Hall element are attached to one of the side walls close to the operational position of the lock member.

5. A buckle according to claim 1, wherein the magnet and the Hall element are positioned side by side along a moving direction where the movable component moves toward the operational position thereof so that the magnetic field of the magnet applied to the Hall element when the movable component is set in the operational position differs from the magnetic field of the magnet applied to the Hall element when the movable component is set in the non-operational position thereof.

6. A buckle according to claim 5, wherein said magnet and Hall element are attached to one of the side walls close to the operational position of the lock member.

7. A buckle according to claim 1, further comprising a CPU connected to the Hall element for detecting a difference of the magnetic fields received by the Hall element when the movable component is located in the operational position and in the non-operational position.

* * * * *